June 18, 1957 E. FEINSTEIN 2,796,103
FOOD SLICING MACHINE
Filed April 6, 1954 3 Sheets-Sheet 1

INVENTOR
Edward Feinstein

June 18, 1957  E. FEINSTEIN  2,796,103
FOOD SLICING MACHINE
Filed April 6, 1954  3 Sheets-Sheet 2
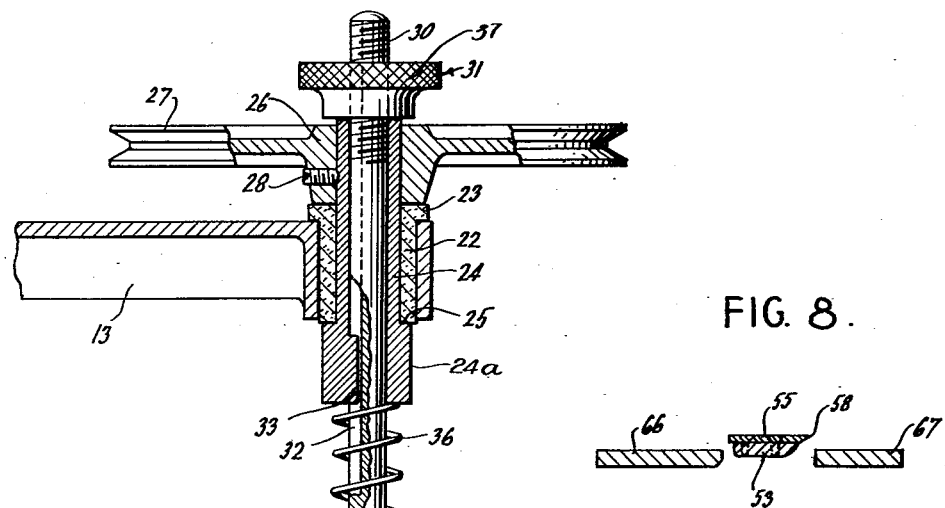
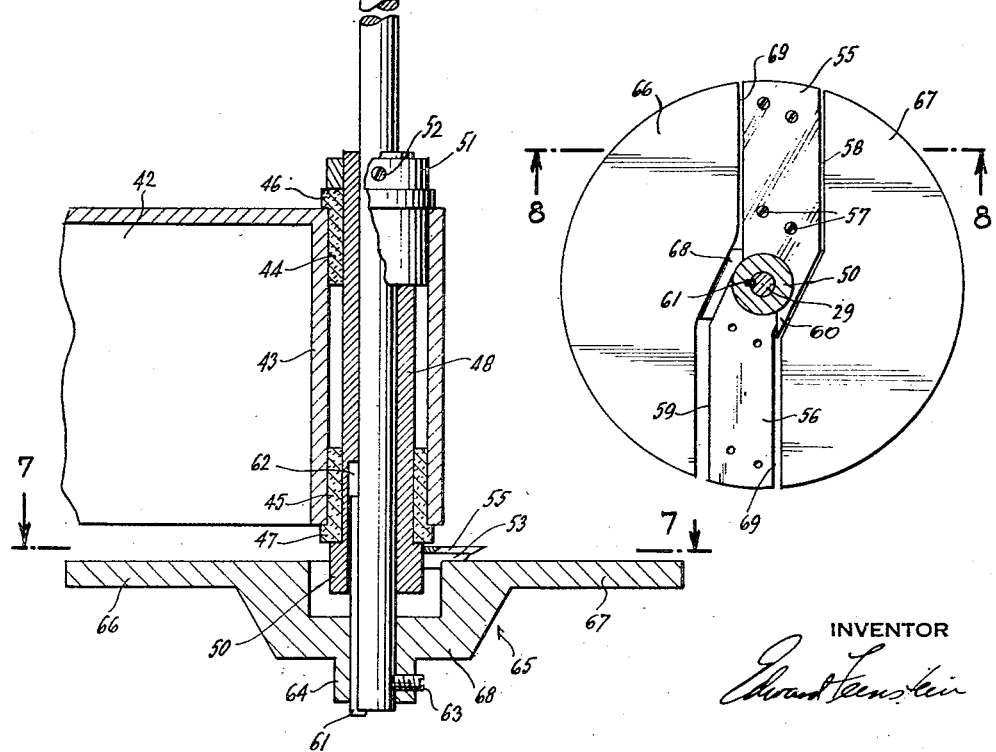
INVENTOR
Edward Feinstein

United States Patent Office 2,796,103
Patented June 18, 1957

2,796,103

FOOD SLICING MACHINE

Edward Feinstein, New York, N. Y.

Application April 6, 1954, Serial No. 421,239

5 Claims. (Cl. 146—124)

My invention relates to food processing machines and in particular to a machine for slicing and shredding foods.

According to my invention, I provide a machine having a bowl for containing food, and knives mounted for rapid rotation within said bowl, the knives being adjustable for varying the thickness of the slices of food being cut thereby.

It is an object of the invention to provide a machine of the type described which is small, compact and portable, and yet which is adapted to cut foods in uniform slices extremely rapidly and efficiently.

Another object of the invention is the provision of a machine of the type described in which the parts coming into contact with the food may be easily dissembled for ready cleaning.

Still another object of the invention is the provision of a machine of the type described in which the shaft carrying the knives is journalled in bearings which are oil free so that the food cannot become contaminated and which are also resistant to acid so that they cannot become corroded from contact with the food or its juices.

A further object of the invention is the provision of a machine of the type described which is particularly adapted for the slicing of small food articles such as pickles, cucumbers, sausages, and the like, and is also adapted for efficient shredding of cabbage and similar foods.

Other objects and advantages of my invention are inherent in the following specification and claims when read in conjunction with the accompanying drawings in which a preferred embodiment of my invention is disclosed, and in which:

Fig. 6 is an enlarged vertical section through the shaft, bearings, and the connected parts, as taken along line 6—6 of Fig. 4;

Fig. 7 is a section on line 7—7 of Fig. 6;

Fig. 8 is a section on line 8—8 of Fig. 7; and

Figure 1:
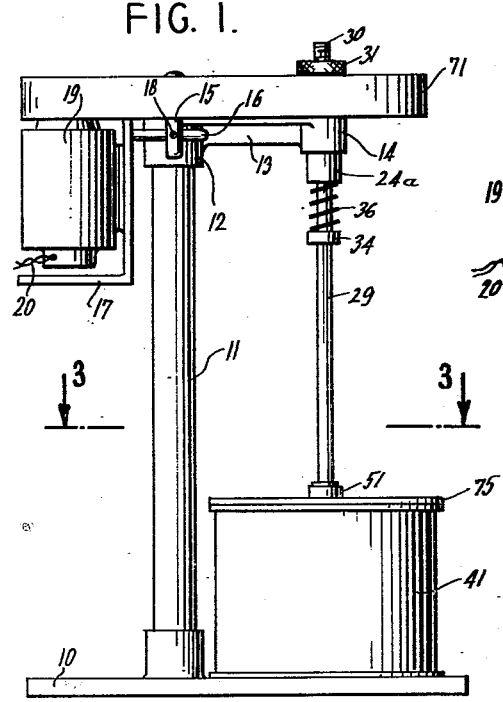
Fig. 1 is an elevation showing a food-cutting machine made according to my invention.
Figure 2:
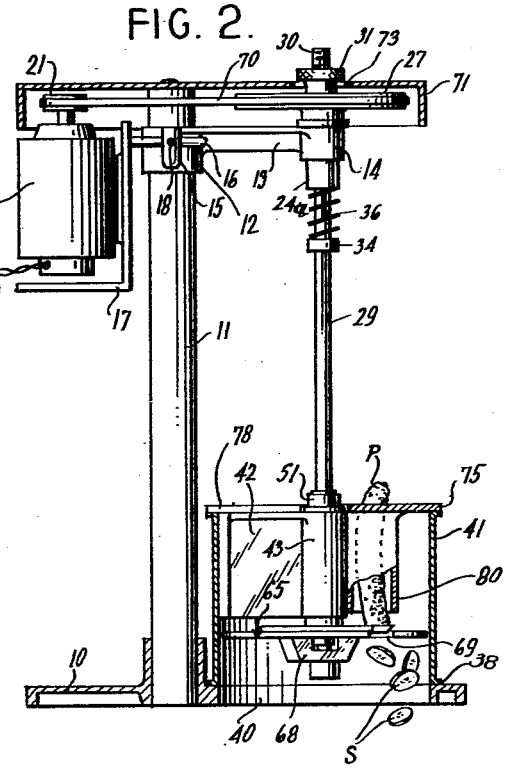
Fig. 2 is a vertical section taken along line 2—2 of Fig. 3, and showing the machine in operation in slicing food.
Figure 3:
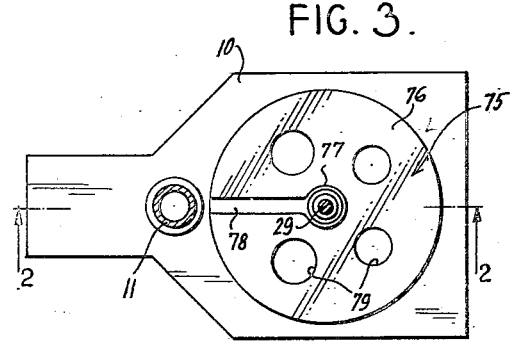
Fig. 3 is a section on line 3—3 of Fig. 1.
Figure 4:
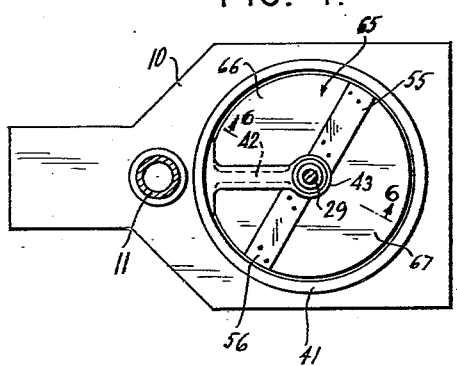
Fig. 4 is a section similar to Fig. 3, but showing the interior of the bowl with the insert 75 removed therefrom.

The slicing machine has a frame, preferably made of aluminum, stainless steel or the like, and including a base 10 on which is rigidly mounted an upright cylindrical standard 11. Mounted on the standard is a collar 12 carrying the lateral arm 13 of a cylindrical bearing 14. The collar 12 has a pair of diametrically opposed, oppositely-extending ears 15 through which extend corresponding parallel mounting arms 16 of a bracket 17, the arms 16 being secured in mounted position by set screws 18. Only one ear 15 and one arm 16 is shown in Figs. 1 and 2, it being understood that an identical ear 15 and arm 16 is located on the opposite side of collar 12.

Rigidly mounted on the bracket 17 is an electric motor 19 having lead wires 20 for connection to a source of electrical current. A pulley 21 is connected to and driven by the motor 19.

Press-fit within the cylinder 14 is a tubular bushing 22, made of a smooth, friction-free, non-metallic material such as nylon or the like which presents a smooth inner sliding surface which is resistant to acid corrosion and does not require oiling. The bushing 22 is formed with an integral top flange 23 which overrides the top surface of the cylinder 14.

Figure 9:
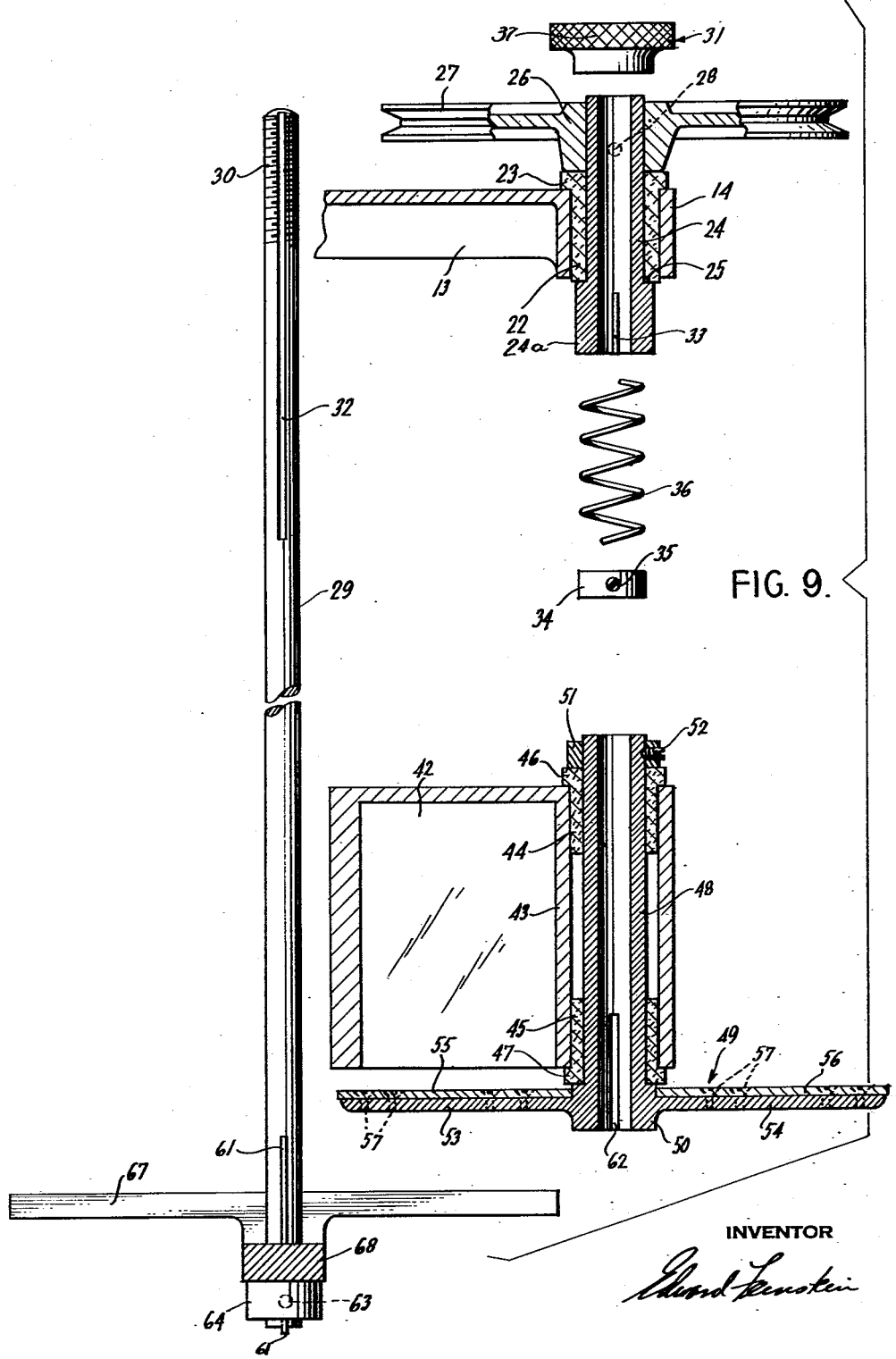
Fig. 9 is an exploded elevational view of the assembly shown in Fig. 6, with portions thereof shown in section to reveal internal construction. In this view, the shaft bearings and associated parts are turned 90° from their position of Fig. 6.

Rotatably mounted within the bushing 22 is a metallic sleeve 24 which has a bottom end 24a of enlarged diameter forming an upwardly facing shoulder 25 which abuts the lower surface of bushing 22. The hub 26 of a pulley 27 is fixedly mounted at the top of the sleeve 24 by a set screw 28. As will be observed in Figs. 6 and 9, the pulley hub 26 rests upon the bushing flange 23 so that the sleeve 24 is restrained from downward movement.

The upper end of a vertical shaft 29 extends through the sleeve 24, its threaded end 30 projecting above said sleeve and having attached thereto an internally threaded circular nut 31 having a knurled outer surface 37 for manual tightening and loosening. The shaft 29 has an elongated longitudinal slot 32 extending downwardly from its top end. A key 33 projecting radially inwardly into the bore of the sleeve 24 extends into the slot 32, thereby connecting the sleeve 24 and the shaft 29 for simultaneous rotation while at the same time permitting the shaft 29 to slide longitudinally or vertically within the sleeve 24. A ring 34 is fixed to the shaft 29 immediately below the slot 32 as by a set screw 35. A compression spring 36 is interposed between the ring 34 and the bottom surface of sleeve 24, the spring 36 urging the shaft 29 downwardly and pressing the nut 31 against the top of sleeve 24, thus normally holding the shaft 29 against vertical movement relative to the sleeve 24 unless the nut 31 is turned, as will be later described.

The portion of base 10 forwardly of the standard 11 has a large circular opening 40 which is the food outlet opening of the slicer. A cylindrical bowl 41 having an internal diameter equal to the diameter of the opening 40 is fixedly mounted on the base 10, as by welding 38, or the like, with its bottom open end in registry with the opening 40, as shown in Fig. 2. The bowl 41 has an integral radial wall 42 terminating in a cylindrical bearing 43 located in the center of said bowl 41.

Press-fit within the bearing 43 are a pair of non-metallic bushings 44 and 45 of the same constituency as the bushing 22 and having respective terminal flanges 46 and 47 abutting the top and bottom edges of the bearing 43. The hollow shank 48 of a cutting member 49 extends snugly but rotatably through both bushings 44 and 45. The shank 48 is integral with an enlarged hub 50 of the cutting member 49, the bore of said shank 48 continuing entirely through the hub 50. The shank 48 is held from vertical movement in the bearing 43 by reason of the abutment of the enlarged hub 50 against the flange 47 of the lower bushing 45, and a ring 51 which is fixedly mounted on the top of shank 48 by a set screw 52 in overlying abutment with the flange 46 of the upper bushing 44.

The cutting member hub 50 has a pair of integral flat lateral arms 53 and 54 to the upper face of which a pair of flat knives 55 and 56 are removably attached by screws 57. The knives 55 and 56 have respective cutting edges 58 and 59 which face in the same direction, as shown in Fig. 7, and overlap the corresponding edges of the carrier arms 53 and 54 as shown in Fig. 8.

It is preferred to shape the knives and arms in the manner shown in Fig. 7, that is, with the inward ends of the knives and arms extending angularly as they join the hub 50 with the effect that the knives and arms are slightly offset from the center of the hub 50 but are nevertheless parallel to each other. By virtue of such arrangement, the cutting edges of the knives 55 and 56 are provided with angular extensions 60 which extend past the hub 50 so that the knives have effective cutting action even at the center of the bowl 41.

The bottom of shaft 29 is provided with a longitudinally extending key 61 and the bore of sleeve 48 is provided with a corresponding longitudinal slot 62, the key and slot interfitting when the lower end of shaft 29 is inserted in said sleeve so that the shaft and sleeve rotate simultaneously while the shaft is afforded a longitudinal sliding movement through said sleeve.

Fixed to the bottom of shaft 29 by a set screw 63 is the hub 64 of a large disc 65 which forms the bottom wall of the bowl 41. This disc 65 is made of two half-sections 66 and 67 joined by a cross-piece 68 which is integral with the hub 64. The half-sections 66 are separated by an angular slot 69 shaped to conform to both of the mounted knives 55 and 56 and of approximately the same width as said knives. The outer periphery of the half-sections 66 forms a circle which is of substantially the same diameter as the internal diameter of the bowl 41, so that the disc 65 closes off the bottom of said bowl but is vertically movable therein.

The pulley 27 and the motor pulley 21 are coupled by an endless V-belt 70 so that when the motor 19 is actuated, the pulley 27, sleeve 24, shaft 29, sleeve 48, arms 53, 54, knives 55, 56 and disc 65 are all rotated in unison. The pulleys 21 and 27 and their belt 70 are enclosed by a hollow cover 71 which is secured to the top of standard 11 by a screw 72. The cover 71 has an opening 73 in its top wall to permit the threaded end 30 of the shaft 29 and the nut 31 to extend therethrough.

The shaft 29 may be moved vertically up or down relative to its bearings 14, 43 by adjustment of the nut 31. Turning of said nut in a clockwise direction will raise the shaft 29 and cause the spring 36 to be compressed. Counterclockwise rotation of the nut 31 lowers the shaft 29, the tension of spring 36 urging the shaft downwardly and insuring gradual and uniform lowering of the shaft as the nut is turned. It will be observed that raising or lowering the shaft 29 and its fixed disc 65, varies the spacing between the knives 55, 56 and the upper surface of the disc 65 so that the thickness of the food slices may be selectively determined.

In operation, the cutting machine may be used without further attachments for the slicing of potatoes, beets, or other bulky vegetables or the like by merely dropping a quantity of such foods into the bowl 41 and upon the disc 65. When the motor 19 is actuated, the disc 65 is rotated, carrying the pieces of food until they abut the bowl wall 42 and are stopped from further movement. The disc 65 and the knives 55, 56 then rotate beneath the food, the knives successively cutting slices off the food, which slices fall through the slot 69 of the disc 65 and drop out of the bottom of the bowl 41. This cutting action continues until the food in the bowl 41 is entirely sliced. The motor 19 rotates the knives at a very fast speed so that the slicing action is extremely rapid. The food is gravity-fed into continuous contact with the knives. The knives are located below the bottom end of the radial wall 42 of bowl 41 so that they may rotate freely without striking said wall.

For the slicing of generally cylindrical objects such as sausages, cucumbers, pickles or the like, the machine is provided with a bowl insert 75 which comprises a top circular plate 76 having a central opening 77 communicating with a radial slot 78 sized to receive therein the top of bowl wall 42. The plate 76 also has a plurality of spaced openings 79 from each of which depend an open cylinder 80. The top plate 76 is of slightly larger diameter than the bowl 41 so that when the insert is affixed in the bowl, as shown in Fig. 2, with the ring 51 of the lower bearing 43 extending through the central opening 77 and the wall 42 projecting partially through the slot 78, the outer periphery of the disc 76 rests flush upon the top surface of the bowl 41. In this position, the bottoms of the cylinders 80 are located well above the knives 55 and 56.

In use, an article of food is inserted into each of the cylinders 80, the food extending entirely through said cylinders and resting upon the upper face of the disc 65. When the motor 19 is actuated, the knives 55 and 56 and the disc 65 rotate rapidly beneath the cylinders 80 and cut slices off the bottom ends of the food articles in succession. Fig. 2 shows a single food article such as a pickle P contained in one of the cylinders 80, the slices S cut from said pickle falling through the slot 69 in disc 65 and dropping out of the open bottom of bowl 41 into any suitable receptacle (not shown) which may be placed beneath said bowl. It will be understood that the cylinders 80 are of larger diameter than the food to be inserted therein, so that the food articles drop downwardly continuously in said cylinders as slices are cut off their bottom ends.

It will be noted in Fig. 2 that the disc 65 which acts as the bottom wall of bowl 41 is spaced an appreciable distance above the open bottom of said bowl. When the food is sliced, the rapid rotation of disc 65 causes the food slices passing through the slot 69 to be flung out centrifugally into contact with the wall of the bowl from which they fall into a suitable receptacle.

In using the insert 75, the thickness of the slices may again be varied by adjustment of the nut 31 to increase or decrease the vertical spacing between the knives 55, 56 and the disc 65.

Figure 5:
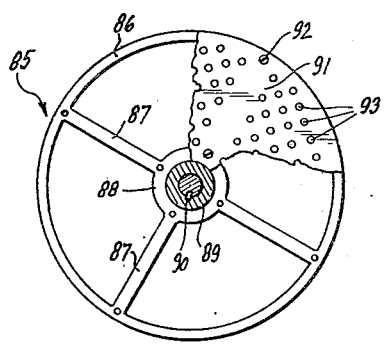
Fig. 5 is an enlarged plan view of the shredder attachment for the machine showing the manner in which it is mounted on the shaft which is shown in section, a portion of the shredder plate being broken away to reveal the structure therebeneath.

For shredding foods such as cabbages, carrots, or the like, a shredding insert 85, shown in Fig. 5, may be provided. This insert 85 comprises a large ring 86 of slightly smaller diameter than the bowl 41, having radial spokes 87 connecting it to a hub 88. The hub 88 is fixed to a sleeve 89 having a longitudinal slot 90. Covering the upper surface of the insert 85 is a shredder plate 91 which is affixed to the ring 86 by screws 92 or the like. The shredder plate has a plurality of closely spaced holes 93 punched therein with one edge portion higher than the other in the manner of conventional shredders.

In use of the shredder insert 85, the sleeve 48 and its knife carriers 53, 54 are removed from the shaft 29 as is the disc 65. The insert hub 88 is then mounted on the bottom of said shaft with the shaft key 61 inserted in the slot 90 of sleeve 89. The cabbage or similar food to be shredded is dropped on the shredder plate 91 and the motor 19 actuated, the bowl wall 42 holding the food from movement with the rotating shredder plate 91.

The machine is relatively small in size and compact so that it may be conveniently kept accessible in restaurant kitchens or the like. An open-frame carrier mounted on wheels may be provided for moving the machine conveniently from place to place, it being merely necessary to insert a bowl or other receptacle beneath the bowl 41 for receiving the sliced or shredded food.

While a preferred embodiment of the invention has been shown and described, it is to be understood that numerous alterations, additions and omissions may be made in the construction of this embodiment without departing from the spirit and scope of the invention as set forth in the following claims.

I claim:

1. A food cutting machine comprising a frame, a bowl mounted on said frame and having a top and bottom open end and a fixed radial wall, a pair of vertically-spaced bearings fixed to said frame, a vertical shaft journalled in said bearings and extending downwardly into the center of said bowl, a sleeve rotatably mounted in each of said bearings, a shaft extending vertically through both said sleeves and keyed thereto for simultaneous rotation therewith and for vertical movement relative thereto, drive means coupled to said shaft for rotating said shaft, a disc fixed to the bottom of said shaft and having a through slot extending substantially diametrically thereof, a pair of knives extending laterally from opposite sides of the lower sleeve in alinement with and spaced above the slot in said disc, said knives and disc being located below the radial wall of said bowl, said disc covering the lower portion of said bowl and serving as the bottom wall thereof, and adjustment means for raising and lowering the shaft in said sleeves whereby to vary the vertical spacing between said disc and said knives, said adjustment means comprising a nut threaded on the top portion of said shaft and overlying the sleeve of the upper bearing.

2. A food cutting machine comprising a frame, a cylindrical bowl mounted on said frame and having a top and bottom open end and a fixed radial wall, a pair of vertically-spaced bearings fixed to said frame above said bowl, a sleeve rotatably mounted in each of said bearings, a shaft extending vertically through both said sleeves and keyed thereto for simultaneous rotation therewith and for vertical movement theerin, said shaft extending downwardly into the center of the bowl, drive means coupled to said shaft for rotating said shaft, spring means interposed between said shaft and one of said sleeves and biasing the shaft downwardly in said bearings, a disc fixed to the bottom of said shaft and having a through slot extending substantially diametricaly thereof, a pair of knives extending laterally from opposite sides of the lower sleeve in alinement with and spaced above the slot in said disc, said knives and disc being located below the radial wall of said bowl, said disc covering the lower portion of said bowl and serving as the bottom wall thereof, and adjustment means for raising and lowering the shaft in said sleeves for varying the vertical spacing between said disc and said knives, said adjusting means comprising a nut threaded on the top portion of said shaft and normally held in abutment with the top of the upper sleeve by said spring means.

3. A food cutting machine comprising a base, a bowl fixed to said base and having a top and bottom open end and a fixed radial wall, a vertical standard fixed to said base and having a lateral arm terminating in an upper bearing, the radial wall of said bowl terminating in a lower bearing vertically alined with said upper bearing, a non-metallic, oil free bushing in each bearing, a sleeve rotatably mounted in each bushing, a shaft extending vertically through both sleeves and extending downwardly into the center of the bowl, a key and slot arrangement connecting said shaft to each of said sleeves for simultaneous rotation therewith, and for vertical movement of said shaft relative to said sleeves, drive means coupled to said shaft for rotating said shaft, spring means interposed between said shaft and one of said sleeves and biasing the shaft downwardly in said bearings, a disc fixed to the bottom of said shaft and having a through slot extending diametrically thereof, a pair of knives extending laterally from opposite sides of the lower sleeve in alinement with and spaced above the slot in said disc, said knives and disc being located below the radial wall of said bowl, said disc covering the lower portion of said bowl and serving as the bottom wall thereof, and adjustment means for raising and lowering the shaft in said sleeves for varying the vertical spacing between said disc and said knives, said adjusting means comprising a nut threaded on the top portion of said shaft and normally held in abutment with the top of the upper sleeve by said spring means.

4. A food cutting machine according to claim 3 in which said drive means includes a pulley mounted on said shaft, a motor mounted on said standard, and a belt connecting said motor and said pulley.

5. A food cutting machine comprising a frame having a base, a bowl fixed to said base and having a top and bottom open end and fixed radial wall terminating in a lower bearing centrally located in said bowl, an upper bearing fixed to said frame and vertically alined with said lower bearing, a sleeve rotatably mounted in each bearing, a shaft extending through both sleeves and keyed thereto for simultaneous rotation therewith and for vertical movement therein, said shaft extending downwardly into the center of said bowl, drive means coupled to said shaft for rotating said shaft, a disc fixed to the bottom of said shaft and having a through slot therein, a knife extending laterally from the lower sleeve in alinement with and spaced above said slot, said knife and disc being located below said radial wall, an adjustment member mounted for selective vertical adjustment on said shaft and engaging the sleeve in the upper bearing means for raising and lowering the shaft in said sleeves for varying the vertical spacing between said disc and said knives, and a removable insert for said bowl, said insert comprising a top plate resting upon the upper surface of said bowl, said top plate having a central opening sized to receive said shaft, a radial slot communicating with said central opening and sized to receive the top of said radial wall, and a plurality of food receiving openings therein, said insert also including a plurality of tubular members depending from the top plate into said bowl and communicating with the respective food receiving openings.

References Cited in the file of this patent

UNITED STATES PATENTS

| | | |
|---|---|---|
| 521,279 | Wright | June 12, 1894 |
| 902,068 | Gardner et al. | Oct. 27, 1908 |
| 1,157,013 | Lewis | Oct. 19, 1915 |
| 1,422,391 | Trust et al. | July 11, 1922 |
| 1,548,042 | Johnston et al. | Aug. 4, 1925 |